United States Patent
Deng et al.

(10) Patent No.: US 11,309,967 B2
(45) Date of Patent: Apr. 19, 2022

(54) COMMUNICATIONS NETWORK AND RELATED DEVICE

(71) Applicant: HUAWEI TECHNOLOGIES CO., LTD., Guangdong (CN)

(72) Inventors: Chaojun Deng, Dongguan (CN); Liankui Lin, Dongguan (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/923,383

(22) Filed: Jul. 8, 2020

(65) Prior Publication Data
US 2020/0343975 A1    Oct. 29, 2020

Related U.S. Application Data

(63) Continuation of application No. PCT/CN2018/122230, filed on Dec. 20, 2018.

(30) Foreign Application Priority Data

Jan. 17, 2018 (CN) .......................... 201810046574.0

(51) Int. Cl.
*H04B 10/272* (2013.01)
*H04Q 11/00* (2006.01)

(52) U.S. Cl.
CPC ....... *H04B 10/272* (2013.01); *H04Q 11/0067* (2013.01); *H04Q 2011/0096* (2013.01)

(58) Field of Classification Search
None
See application file for complete search history.

(56) References Cited

U.S. PATENT DOCUMENTS 6,798,567 B2 * 9/2004 Feldman .............. H04B 10/296
                                                                        359/341.42
8,458,468 B2    6/2013 Leone et al.
(Continued)

FOREIGN PATENT DOCUMENTS

CN          1547335 A        11/2004
CN          1855778 A   *    11/2006
(Continued)

OTHER PUBLICATIONS

PCT International Search Report and Written Opinion issued in International Application No. PCT/CN2018/122230 dated Feb. 27, 2019, 13 pages (with English translation).
(Continued)

*Primary Examiner* — Darren E Wolf
(74) *Attorney, Agent, or Firm* — Fish & Richardson P.C.

(57) ABSTRACT

This application discloses a communications network and a related device. In one embodiment, the communications network includes a first optical line terminal and a second optical line terminal. The first optical line terminal is configured to send, through a first passive optical network (PON) interface based on a first PON protocol, a first optical signal to the at least one second optical line terminal. The second optical line terminal is configured to process the first optical signal and send through a second PON interface based on a second PON protocol, a processed first optical signal to at least one customer-premises equipment during downstream data transmissions, and process a second optical signal and send, through the first PON interface based on the first PON protocol, the processed second optical signal to the first optical line terminal during upstream data transmissions.

17 Claims, 8 Drawing Sheets

(56) References Cited

U.S. PATENT DOCUMENTS

| | | | | |
|---|---|---|---|---|
| 2003/0179987 A1* | 9/2003 | Gage | ............... | H04B 10/2916 385/24 |
| 2005/0169319 A1* | 8/2005 | Mohamadi | ............. | H04L 25/14 370/514 |
| 2008/0232804 A1* | 9/2008 | Absillis | ................ | H04J 3/14 398/71 |
| 2008/0310861 A1* | 12/2008 | Wong | ................ | H03K 5/084 398/210 |
| 2010/0027545 A1* | 2/2010 | Gomes | ............... | H04L 69/12 370/392 |
| 2015/0055956 A1* | 2/2015 | Lee | ................ | H04B 10/272 398/79 |
| 2015/0249501 A1* | 9/2015 | Nagarajan | ............ | H04B 10/40 398/79 |
| 2015/0373430 A1* | 12/2015 | Kim | ............... | H04Q 11/0067 398/48 |
| 2015/0381367 A1* | 12/2015 | Zarcone | ............ | H04L 9/3218 713/170 |
| 2017/0290515 A1* | 10/2017 | Butte | ................ | G01J 3/4406 |
| 2017/0339206 A1* | 11/2017 | Holden | ........... | H04N 21/25825 |
| 2017/0366891 A1* | 12/2017 | Yang | ................ | G06F 3/017 |

FOREIGN PATENT DOCUMENTS

| | | |
|---|---|---|
| CN | 1855778 A | 11/2006 |
| CN | 101459656 A | 6/2009 |
| CN | 102377479 A | 3/2012 |
| CN | 104519420 A | 4/2015 |
| EP | 1128585 A2 | 8/2001 |
| EP | 2164221 A1 | 3/2010 |
| JP | 2010537600 A | 12/2010 |
| JP | 2012178884 A | 9/2012 |
| JP | 2016501466 A | 1/2016 |
| RU | 2601124 C1 | 10/2016 |
| WO | 2015134789 A1 | 9/2015 |
| WO | 2017223235 A1 | 12/2017 |

OTHER PUBLICATIONS

Office Action issued in Chinese Application No. 201810046574.0 dated Feb. 1, 2021, 11 pages.

Extended European Search Report issued in European Application No. 18901396.4 dated Feb. 9, 2021, 21 pages.

Hasegawa et al., "Transmission Characterization in Active Optical Access System," Institute of Electronics, Information and Communication Engineers, Technical Report vol. 109, No. 399, Japan, dated Jan. 28-29, 2010, 9 pages (English abstract).

Office Action issued in Japanese Application No. 2020-535204 dated Sep. 21, 2021, 5 pages (with English translation).

Office Action issued in Russian Application No. 2020126912/07 dated Dec. 8, 2021, 27 pages (with English translation).

* cited by examiner

| Downstream access module | Downstream access module | Downstream access module | Control module | Control module | Downstream access module | Upstream access module | Upstream access module |
|---|---|---|---|---|---|---|---| though the second PON interface, and encapsulate a parsed

COMMUNICATIONS NETWORK AND RELATED DEVICE

CROSS-REFERENCE TO RELATED APPLICATIONS

This application is a continuation of International Application No. PCT/CN2018/122230, filed on Dec. 20, 2018, which claims priority to Chinese Patent Application No. 201810046574.0, filed on Jan. 17, 2018. The disclosures of the aforementioned applications are hereby incorporated by reference in their entireties.

TECHNICAL FIELD

This application relates to the field of optical communications technologies, and in particular, to a communications network and a related device.

BACKGROUND

Current broadband access technologies are mainly categorized into copper access technologies (for example, various DSL technologies) and optical access technologies. An access network implemented by using the optical access technology is referred to as an optical access network (OAN).

A passive optical network (PON) is an implementation technology of the optical access network, and the PON is an optical access technology featuring point-to-multipoint transmission. A system architecture of the PON is shown in FIG. 1.

In FIG. 1, an optical line terminal (OLT) is configured to provide a network side interface for an OAN. The OLT is connected to an upper-layer network side device (such as a switch or a router), and is connected to one or more lower-layer optical distribution networks (ODN).

The ODN includes a passive optical splitter configured for optical power distribution, a feeder fiber connecting the passive optical splitter to the OLT, and a distribution fiber connecting the passive optical splitter to an optical network unit (ONU). During data downstream transmission, the ODN transmits downstream data of the OLT to each ONU by using the passive optical splitter. Similarly, during data upstream transmission, the ODN aggregates upstream data of the ONU and transmits the aggregated upstream data to the OLT.

The ONU provides a user side interface for the OAN and is connected to the ODN. If the ONU further provides a user port function, for example, the ONU provides an Ethernet user port or a plain old telephone service (POTS) user port, the ONU is referred to as an optical network terminal (ONT).

As shown in FIG. 1, a conventional OLT is usually located in a central office (CO), and the CO usually further includes a network side device. The PON network shown in FIG. 1 is applicable to a scenario in which the ONU and the ONT are deployed in an area such as a city close to the central office.

With the popularization of broadband services, more ONUs and ONTs are deployed in a remote area, and the OLT device needs to be gradually deployed downstream from the central office to the remote area such as a village or town. However, a conventional PON networking mode shown in FIG. 1 cannot meet this requirement. Therefore, how to construct a PON network to enable devices, such as ONUs and ONTs, to be deployed in the remote area to support broadband services is an urgent problem to be resolved.

SUMMARY

This application provides a communications network and a related apparatus, so that a broadband service can be accessed in a remote area, and transmission media can be saved and networking costs can be reduced.

According to a first aspect, this application provides an optical line terminal, including a processor, a memory, and a communications apparatus, where the communications apparatus is configured with a first PON interface and a second PON interface;

during data downstream transmission, the communications apparatus is configured to receive, through the first PON interface, a first optical signal sent by a first optical line terminal; the processor is configured to process the first optical signal; and the communications apparatus is further configured to send a processed first optical signal to customer-premises equipment through the second PON interface; and during data upstream transmission, the communications apparatus is configured to receive, through the second PON interface, a second optical signal sent by the customer-premises equipment; the processor is configured to process the second optical signal; and the communications apparatus is further configured to send a processed second optical signal to the first optical line terminal through the first PON interface.

Specifically, the first PON interface may be connected to an upper-layer device of the optical line terminal, that is, the first optical line terminal; and the second PON interface may be connected to a lower-layer device of the optical line terminal, that is, the customer-premises equipment.

The first PON interface and the second PON interface are ports that are used for data connection in a communications network and for which a PON technology is used. Different PON technologies or a same PON technology may be used for the first PON interface and the second PON interface. In other words, the first PON interface and the second PON interface may correspond to different protocols or a same PON protocol.

Two cases are provided below to describe a process in which the processor processes an optical signal received by the optical line terminal.

(1) The first PON interface and the second PON interface correspond to different protocols.

When the first PON interface and the second PON interface are of different types, the optical line terminal needs to perform protocol conversion on the received optical signal for sending. This application provides the following two conversion manners:

In a first manner, protocol conversion is directly performed on the optical signal. In an optional embodiment, during data downstream transmission, the processor is configured to: parse, by using a protocol corresponding to the first PON interface, the first optical signal received through the first PON interface, and encapsulate a parsed first optical signal by using a protocol corresponding to the second PON interface, to complete protocol conversion of the first optical signal. During data upstream transmission, the processor is configured to: parse, by using the protocol corresponding to the second PON interface, the second optical signal received through the second PON interface, and encapsulate a parsed second optical signal by using the protocol corresponding to the first PON interface, to complete protocol conversion of the second optical signal.

In a second manner, after the optical signal is converted into an electrical signal, protocol conversion is performed on the electrical signal. In an optional embodiment, the optical line terminal may further include an optical module, a first PON MAC chip, and a second PON MAC chip. The first PON MAC chip uses a protocol corresponding to the first PON interface, and the second PON MAC chip uses a protocol corresponding to the second PON interface.

During data downstream transmission, the processor is specifically configured to: indicate the optical module to convert the first optical signal received through the first PON interface into a first electrical signal, indicate the first PON MAC chip to perform protocol deframing on the first electrical signal, indicate the second PON MAC chip to perform protocol framing on a first electrical signal obtained after protocol deframing, and indicate the optical module to perform electrical-to-optical conversion on a first electrical signal obtained after protocol framing, to obtain a processed first optical signal. Therefore, protocol conversion of the first optical signal is completed.

During data upstream transmission, the processor is specifically configured to: indicate the optical module to convert the second optical signal received through the second PON interface into a second electrical signal, indicate the second PON MAC chip to perform protocol deframing on the second electrical signal, indicate the first PON MAC chip to perform protocol framing on a second electrical signal obtained after protocol deframing, and indicate the optical module to perform electrical-to-optical conversion on a second electrical signal obtained after protocol framing, to obtain a processed second optical signal. Therefore, protocol conversion of the second optical signal is completed.

(2) The first PON interface and the second PON interface correspond to a same protocol.

When the first PON interface and the second PON interface have a same type, the optical line terminal may perform processing, for example, perform denoising and signal enhancement on the received optical signal through the processor, to improve signal transmission reliability.

In an optional embodiment, the communications apparatus is further configured with an Ethernet interface. During data downstream transmission, the communications apparatus is further configured to receive, through the Ethernet interface, a first electrical signal sent by a network side device; the processor is further configured to convert the first electrical signal into a third optical signal; and the communications apparatus is further configured to send the third optical signal to the customer-premises equipment through the second PON interface. During data upstream transmission, the communications apparatus is further configured to receive, through the second PON interface, a fourth optical signal sent by the customer-premises equipment; the processor is further configured to convert the fourth optical signal into a second electrical signal; and the communications apparatus is further configured to send the second optical signal to the network side device through the Ethernet interface.

When being connected to an upper-layer device, the optical line terminal in this application may be connected, through the first PON interface, to a device (for example, a conventional optical line terminal) that supports a downstream PON, and may be further connected to the network side device such as a switch or a router through the conventional Ethernet interface. Compared with the conventional optical line terminal, the optical line terminal in this application has more diversified application scenarios.

According to a second aspect, this application provides a communications network, including a first optical line terminal, a second optical line terminal, and customer-premises equipment, where the first optical line terminal is connected to at least one second optical line terminal through a PON interface, and the second optical line terminal is connected to at least one customer-premises equipment through the PON interface;

during data downstream transmission, the first optical line terminal is configured to send a first optical signal to the at least one second optical line terminal, and the second optical line terminal is configured to process the first optical signal and send a processed first optical signal to the at least one customer-premises equipment; and during data upstream transmission, the customer-premises equipment is configured to send a second optical signal to the second optical line terminal connected to the customer-premises equipment, and the second optical line terminal is configured to process the second optical signal and send at least one processed second optical signal to the first optical line terminal.

The second optical line terminal may be the optical line terminal provided in the first aspect. For a signal processing process performed by the second optical line terminal, refer to related descriptions of the optical line terminal in the first aspect.

Optionally, the communications network further includes a first optical distribution network and a second optical distribution network. The first optical distribution network may provide an optical signal transmission path between the first optical line terminal and the second optical line terminal. The second optical distribution network may provide an optical signal transmission path between the second optical line terminal and the customer-premises equipment.

Further, optionally, the first optical distribution network may include at least one optical splitter, and the second optical distribution network may also include at least one optical splitter. The at least one optical splitter in the first optical distribution network may be configured to perform multi-level splitting processing on an optical signal sent by the first optical line terminal, and then send a processed optical signal to the second optical line terminal, where a quantity of levels is related to a quantity of optical splitters. Similarly, the at least one optical splitter in the second optical distribution network may be configured to: perform multi-level splitting processing on an optical signal sent by the second optical line terminal, and then send a processed optical signal to the customer-premises equipment, where a quantity of levels is related to a quantity of optical splitters. With an optical splitter, only one optical fiber may be used to enable connection to an upper-layer device in an optical distribution network. Then, a plurality of optical fibers are used starting from the optical fiber, to connect to lower-layer devices. Such a point-to-multipoint transmission mode can reduce transmission medium overheads and networking costs.

In an optional embodiment, in the first distribution network, a distance between the optical splitter and the second optical line terminal is less than a distance between the optical splitter and the first optical line terminal. The optical splitter is connected to the first optical line terminal in the upstream through one optical fiber, and is connected to a plurality of second optical line terminals in the downstream through a plurality of optical fibers. Therefore, when the optical splitter in the first distribution network is disposed at a location closer to the second optical line terminal, lengths of the plurality of optical fibers can be shortened, and networking costs can be reduced.

In an optional embodiment, in the second optical distribution network, a distance between the optical splitter and the customer-premises equipment is less than a distance between the optical splitter and the second optical line terminal. The optical splitter is connected to the second optical line terminal in the upstream through one optical fiber, and is connected to a plurality of customer-premises equipment in the downstream through a plurality of optical fibers. Therefore, when the optical splitter in the second optical distribution network is disposed at a location closer to the customer-premises equipment, lengths of the plurality of optical fibers can be shortened, and networking costs can be reduced.

The communications network in this application includes the first optical line terminal, the second optical line terminal, and the customer-premises equipment. The second optical line terminal may be connected to a first optical line terminal at an upper layer through the PON interface, and may be further connected to customer-premises equipment at a lower layer through the PON interface. The communications network in this application enables a user in a remote area to access a broadband service. In addition, the PON interface features point-to-multipoint transmission, and therefore transmission media can be saved and networking costs can be reduced.

DESCRIPTION OF EMBODIMENTS

Terms used in implementations of this application are merely used to explain specific embodiments of this application, but are not intended to limit this application.

Figure 2:
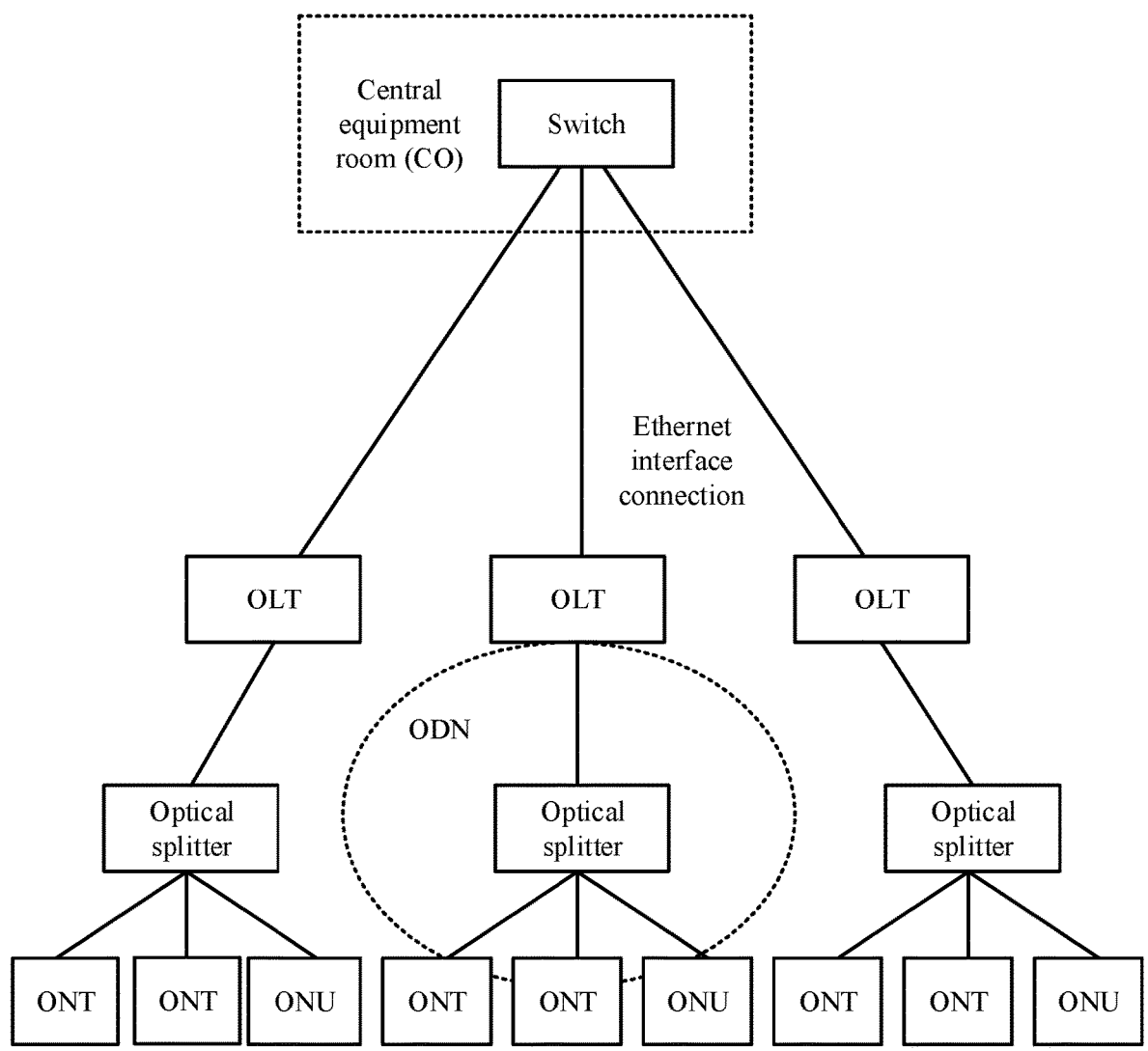
FIG. 2 is a structural diagram of another PON network in the prior art.

FIG. 2 is a structural diagram of a possible PON network in the prior art. As shown in FIG. 2, OLT devices are not deployed in a central office, but deployed closer to devices such as ONTs or ONUs. The PON network shown in FIG. 2 may include more OLTs, to enable more users in a remote area to access a broadband service.

Although the PON network shown in FIG. 2 enables access to the broadband service in the remote area, a network side device is connected to the OLT through an Ethernet interface, and major transmission media include a network cable, an optical fiber, and the like. Because the Ethernet interface features point-to-point transmission, an independent transmission medium needs to be deployed between each OLT device and the network side device. However, due to a relatively large quantity of OLT devices, a large quantity of transmission media are required to deploy the PON network shown in FIG. 2. Consequently, networking costs are high.

To enable access to the broadband service in the remote area and reduce networking costs, this application provides a PON network and an optical line terminal, to provide the broadband service in the remote area. In addition, networking costs are low, and this application is easy to implement.

For ease of understanding this application, several technical terms in this application are first described.

(1) PON Interface

A PON is a point-to-multipoint optical access technology. The PON interface is a port that is used for data connection in a communications network and for which the PON is used. A transmission medium connected to the PON interface is an optical fiber, and the PON interface may be configured to receive or send an optical signal.

There are many types of PONs, such as an asynchronous transfer mode PON (ATM passive optical network, APON), a broadband PON (broadband passive optical network, BPON), an Ethernet PON (ethernet passive optical network, EPON), a gigabit-capable PON (gigabit-capable passive optical network, GPON), and a 10 Gbit/s Ethernet PON (10G ethernet passive optical network, 10G EPON). Therefore, there may also be many types of PON interfaces, such as a GPON interface, an EPON interface, a symmetric 10G GPON interface, an asymmetric 10G GPON interface, a 10G EPON interface, a TWDM PON interface, and a future PON interface having a higher working rate.

It may be understood that different protocols may be used for different PONs, and signal formats may be different when signals are transmitted by using different PON technologies.

In this application, different types of PON interfaces correspond to different protocols, and a signal that can be identified by the PON interface and transmitted through the PON interface is a signal encapsulated by using a corresponding protocol. Therefore, if a device includes two PON interfaces of different types, protocol conversion processing needs to be performed on a signal received through one PON interface, and the signal can be sent through the other PON interface only after the signal is encapsulated by using a protocol corresponding to the other PON interface.

In this application, a type of a PON interface identifies a type of an optical access technology used for the PON interface, and also identifies a protocol corresponding to the PON interface.

It may be understood that the PON interface performs communication in a point-to-multipoint manner. For example, as shown in FIG. 2, the OLT is connected to customer-premises equipment through a PON interface, and may be connected to a plurality of ONTs through one PON interface. In other words, for a plurality of PON interfaces connecting the OLT to customer-premises equipment in the downstream, each PON interface may correspond to a plurality of customer-premises equipment.

(2) Split Ratio

The split ratio is a concept specific to the PON interface and indicates a quantity of customer-premises equipment that may be with one PON interface. To be specific, the split ratio indicates a quantity of customer-premises equipment that can be connected to one PON interface. For example, a split ratio of a PON interface defined in an EPON standard is 1:32, and split ratios of a PON interface defined in a GPON standard are 1:32, 1:64, and 1:128. For example, an EPON interface supports a maximum split ratio of 1:32. The EPON interface may output a maximum of 32 channels of optical signals, and the 32 channels of optical signals are transmitted to 32 different customer-premises equipment respectively.

It is clear that when communication is performed in the communications network through the PON interface in the point-to-multipoint manner, less transmission media are used and costs are relatively low.

(3) Ethernet Interface

Ethernet is a most widely applied local area network communication mode and is also a protocol. An Ethernet interface is a port that is used for data connection in a network structure and for which the Ethernet protocol is used. The Ethernet interface may be configured to receive or send a signal, such as an Ethernet frame, for which the Ethernet protocol is used.

The Ethernet interface mentioned in this application may include various types, for example, includes at least one of an SC fiber interface, an RJ-45 interface, an FDDI interface, an AUI interface, a BNC interface, or a console interface. Transmission media connected to the Ethernet interface may include a coaxial cable, a twisted pair, an optical fiber, and the like.

The Ethernet interface performs communication in a point-to-point manner. For example, as shown in FIG. 2, a switch is connected to the OLT through an Ethernet interface. When there are a plurality of OLTs, the switch needs to be connected to different OLTs through different Ethernet interfaces. In other words, for a plurality of Ethernet interfaces connecting the switch to the OLTs, each Ethernet interface corresponds to only one OLT.

It is clear that when communication is performed in the communications network through the Ethernet interface in the point-to-point manner, more transmission media are used and costs are relatively high.

Figure 3:
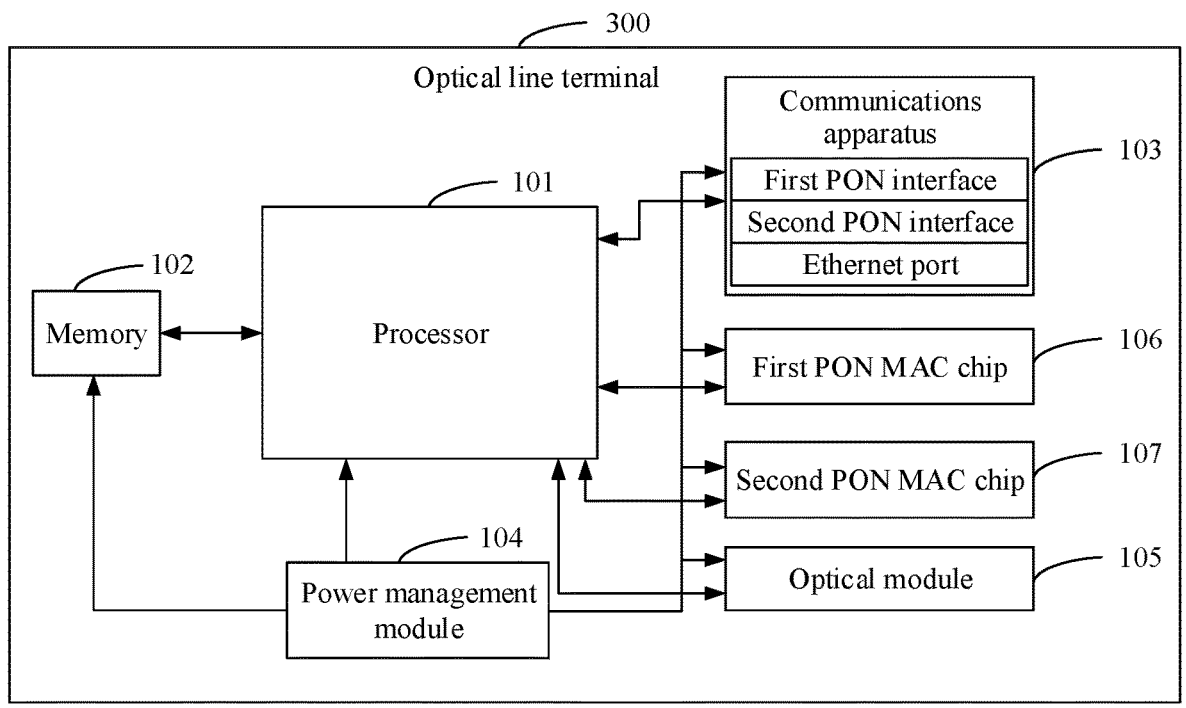
FIG. 3 is a schematic diagram of a hardware structure of an optical line terminal according to this application.

FIG. 3 is a schematic diagram of a hardware structure of an optical line terminal 300 according to this application. As shown in FIG. 3, the optical line terminal 300 mainly includes a processor 101, a memory 102, a communications apparatus 103, and a power management module 104.

The power management module 104 is configured to provide a stable current for the optical line terminal 300.

The communications apparatus 103 may be configured for communication between the optical line terminal 300 and another communications device, for example, a network side device, another optical line terminal, or customer-premises equipment. In this application, the communications apparatus is configured with a first PON interface and a second PON interface. The first PON interface is configured for optical communication between the optical line terminal 300 and an upper-layer device (another optical line terminal at an upper layer). The second PON interface is configured for optical communication between the optical line terminal 300 and the customer-premises equipment. The first PON interface and the second PON interface are ports using a PON (passive optical network) technology for connection. The first PON interface may include at least one of a GPON interface, an EPON interface, a symmetric 10G GPON interface, an asymmetric 10G GPON interface, a 10G EPON interface, a TWDM PON interface, or a future PON interface having a higher working rate. The second PON interface may include at least one of a GPON interface, an EPON interface, a symmetric 10G GPON interface, an asymmetric 10G GPON interface, a 10G EPON interface, a TWDM PON interface, or a future PON interface having a higher working rate. Reference may be made to a related description of the foregoing technical term (1). Details are not described herein.

In this application, the first PON interface and the second PON interface may be PON interfaces of different types, or may be PON interfaces of a same type. The following describes functions of modules in the optical line terminal 300 in different cases.

(1) The first PON interface and the second PON interface are PON interfaces of different types.

Optionally, the first PON interface and the second PON interface may be PON interfaces of different types. The processor 101 is configured to perform protocol conversion processing on an optical signal that is received through the first PON interface or the second PON interface, so that a processed optical signal is adapted to the second PON interface or the first PON interface. Two conversion manners are described below.

In a first manner, protocol conversion is directly performed on the optical signal. In an optional embodiment, during data downstream transmission, the processor 101 is configured to: parse, by using a protocol corresponding to the first PON interface, a first optical signal received through the first PON interface, and encapsulate a parsed first optical signal by using a protocol corresponding to the second PON interface, to complete protocol conversion of the first optical signal. During data upstream transmission, the processor 101 is configured to: parse, by using the protocol corresponding to the second PON interface, a second optical signal received through the second PON interface, and encapsulate a parsed second optical signal by using the protocol corresponding to the first PON interface, to complete protocol conversion of the second optical signal.

In a second manner, after the optical signal is converted into an electrical signal, protocol conversion is performed on the electrical signal. In an optional embodiment, the optical line terminal 300 may further include an optical module 105, a first PON MAC chip 106, and a second PON MAC chip 107. The first PON MAC chip 106 uses a protocol corresponding to the first PON interface, and the second PON MAC chip uses a protocol corresponding to the second PON interface.

During data downstream transmission, the processor 101 is specifically configured to: indicate the optical module 105 to convert a first optical signal received through the first PON interface into a first electrical signal, indicate the first PON MAC chip 106 to perform protocol deframing on the first electrical signal, indicate the second PON MAC chip 107 to perform protocol framing on a first electrical signal obtained after protocol deframing, and indicate the optical module 105 to perform electrical-to-optical conversion on a first electrical signal obtained after protocol framing, to obtain a processed first optical signal. In this way, protocol conversion of the first optical signal is completed.

During data upstream transmission, the processor 101 is specifically configured to: indicate the optical module 105 to convert a second optical signal received through the second PON interface into a second electrical signal, indicate the second PON MAC chip 107 to perform protocol deframing on the second electrical signal, indicate the first PON MAC chip 106 to perform protocol framing on a second electrical signal obtained after protocol deframing, and indicate the optical module 105 to perform electrical-to-optical conversion on a second electrical signal obtained after protocol framing, to obtain a processed second optical signal. In this way, protocol conversion of the second optical signal is completed.

(2) The first PON interface and the second PON interface are PON interfaces of a same type.

When the first PON interface and the second PON interface have a same type, the optical line terminal may perform processing, for example, perform denoising and signal enhancement, on a received signal through the processor, to improve signal transmission reliability.

Optionally, the communications apparatus 103 may be further configured with an Ethernet interface. The Ethernet interface is an interface that performs communication by using an Ethernet protocol, and may be configured for communication between the optical line terminal 300 and an upper-layer network side device (a switch, a router, or the like).

The memory 102 is coupled to the processor 101, and is configured to store various software programs and/or a plurality of sets of instructions. Specifically, the memory 102 may include a high-speed random access memory, or may include a nonvolatile memory, for example, one or more disk storage devices, a flash memory device, or another nonvolatile solid-state storage device. The memory 102 may store an operating system (which is briefly referred to as a system below), for example, an embedded operating system such as Android, iOS, Windows, or Linux. The memory 102 may further store a network communications program. The network communications program may be used to communicate with one or more optical line terminals, one or more customer-premises equipment, or one or more network side devices.

The processor 101 may be configured to: read and execute a computer-readable instruction; implement a function of managing the optical line terminal 300; parse, control, or process a packet received by the optical line terminal 300; and the like. Specifically, the processor 101 may be configured to invoke a program stored in the memory 102, and execute an instruction included in the program. The instruction may be used for implementing a function of signal transmission of the optical line terminal 300 in a PON communications network.

It may be understood that the optical line terminal 300 may further include an upstream board, a backplane that provides a physical connection for each unit, a clock, a fan, a fan control module, and the like. Details are not described herein.

It should be noted that the optical line terminal 300 shown in FIG. 3 is only an implementation of this application. In actual application, the optical line terminal 300 may alternatively include more or fewer components, and this is not limited herein.

It can be learnt from the structure shown in FIG. 3 that, when being connected to an upper-layer device, the optical line terminal 300 may be connected, through the first PON interface, to a device (for example, a conventional optical line terminal) that supports a downstream PON, or may be connected to a network side device such as a switch or a router through a conventional Ethernet interface. Compared with the conventional optical line terminal, the optical line terminal 300 in this application has more diversified application scenarios.

In specific implementation, there may be many actual forms of the optical line terminal. The following briefly describes two possible implementation forms of the optical line terminal.

Figure 4:
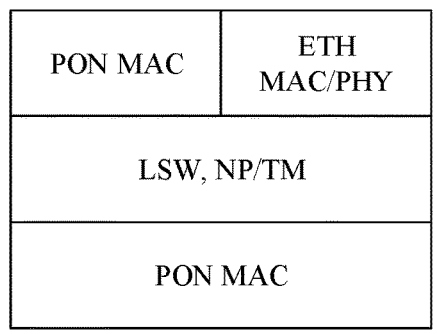
FIG. 4 is a schematic diagram of a form of an optical line terminal according to this application.

In an optional embodiment, the optical line terminal 300 may be implemented in a form of a box-type device or an integrated device. Referring to FIG. 4, from the perspective of a protocol, the optical line terminal includes one or more PON MAC chips configured to process a communication service between the optical line terminal and an upper-layer device. The PON MAC chip is configured to implement a function of PON media access control (MAC) layer protocol processing. The optical line terminal further includes a component or chip configured to implement a forwarding function. The component or chip may be configured to implement local area network switch (LAN switch, LSW) forwarding, network processing (NP), traffic management (TM), or the like. The optical line terminal further includes one or more PON MAC chips configured to process a communication service between the optical line terminal and a lower-layer device. The PON MAC chip is configured to implement a function of PON media access control (MAC) layer protocol processing.

Optionally, the optical line terminal may further include one or more ETH MACs/PHYs configured to process a communication service between the optical line terminal and an upper-layer device. The ETH MAC/PHY is configured to implement a function of Ethernet MAC layer protocol processing/Ethernet physical layer protocol processing during communication with the upper-layer device.

Figures 5, 6:
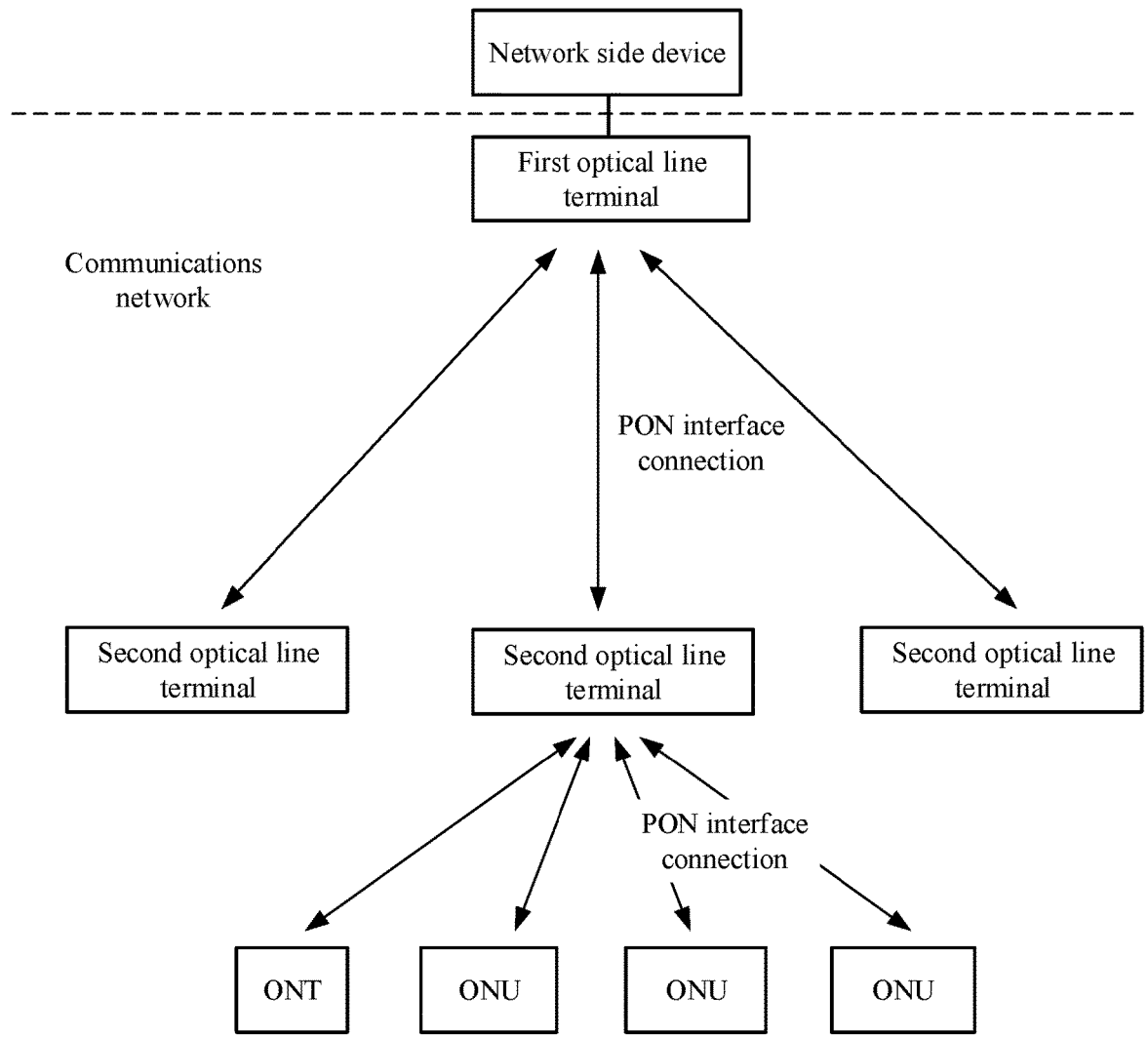
FIG. 5 is a schematic diagram of a device form of another optical line terminal according to this application.
FIG. 6 is a schematic diagram of a structure of a communications network according to this application.

In another optional embodiment, the optical line terminal 300 may be further implemented in a form of a frame-type device. Referring to FIG. 5, the optical line terminal may include one or more upstream access modules, one or more control modules, and one or more downstream access modules.

The upstream access module provides a first PON interface. The downstream access module provides a second PON interface. The control module is configured to control the optical line terminal to implement a function of protocol processing, packet switching, packet forwarding, or the like.

Further, an upstream interface may further include a conventional Ethernet interface, to enable the optical line terminal to be applied to more optical communications scenarios.

Based on the optical line terminal 300 described above, this application provides a communications network, to enable access to a broadband service in a remote area and to reduce networking costs during construction of the communications network.

A main inventive principle of this application may be as follows: An optical line terminal includes a first PON interface used for communicating with an upper-layer device. The first PON interface may be used for point-to-multipoint communication between the upper-layer device and a plurality of optical line terminals. This can save transmission media and reduce networking costs.

FIG. 6 is a schematic diagram of a structure of a communications network according to this application. The following separately describes devices, connections between the devices, deployment locations, a data transmission process, and the like in the communications network in this application with reference to FIG. 6.

1. Connections Between the Devices

As shown in FIG. 6, the communications network includes a first optical line terminal, a second optical line terminal, and customer-premises equipment. The first optical line terminal is connected to at least one second optical line terminal through a PON interface, and the second optical line terminal is connected to at least one customer-premises equipment through a PON interface.

In this application, the first optical line terminal is connected to the second optical line terminal through a PON interface, the second optical line terminal is also connected to the customer-premises equipment through a PON interface, and transmission media are both optical fibers.

Figure 7:
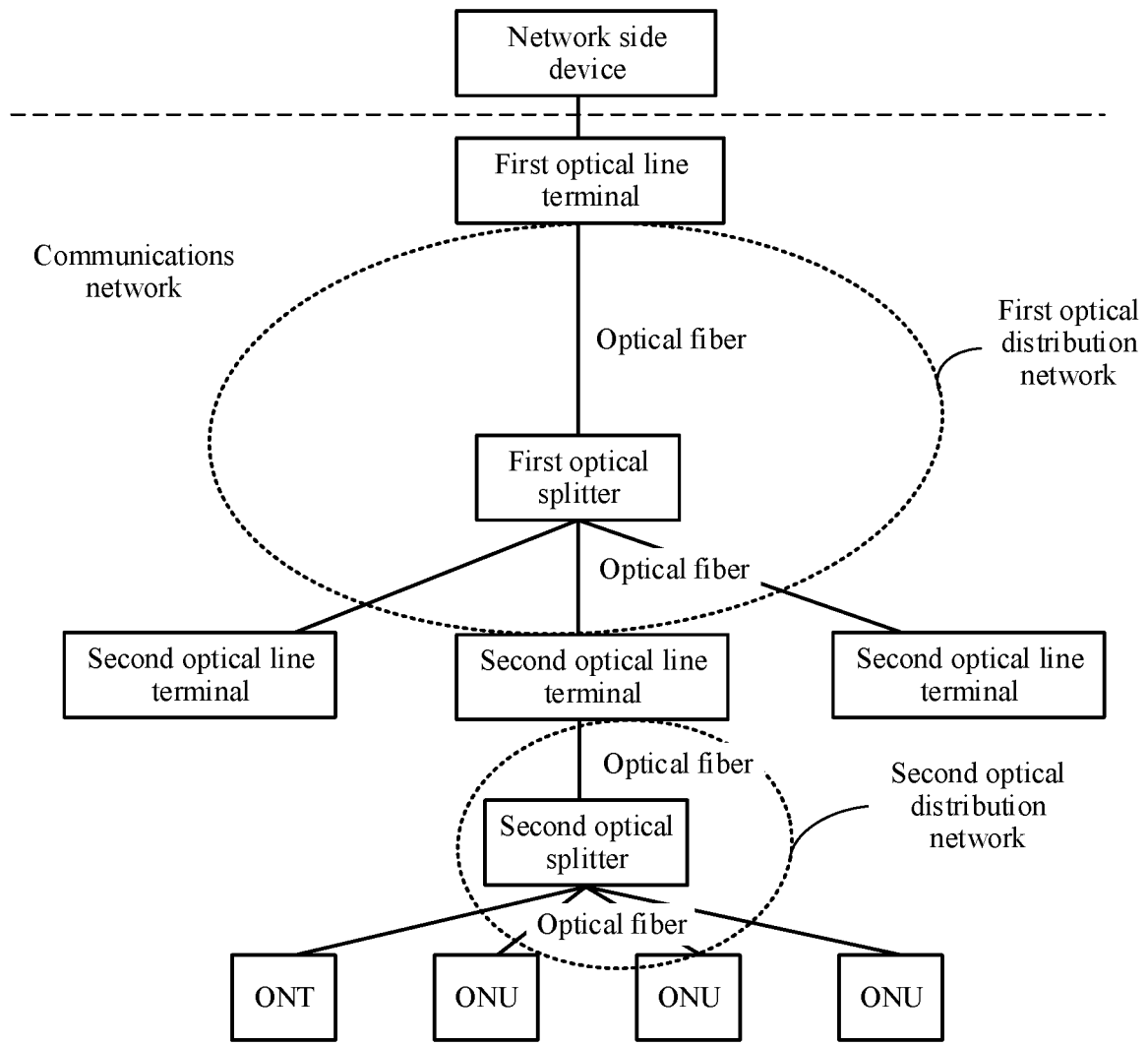
FIG. 7 is a schematic diagram of a structure of another communications network according to this application.

In an optional embodiment, the first optical line terminal and the second optical line terminal may be connected through a first optical distribution network, and the second optical line terminal and the customer-premises equipment may be connected through a second optical distribution network. Referring to FIG. 7, the first optical distribution network may provide an optical signal transmission path between the first optical line terminal and the second optical line terminal. The second optical distribution network may provide an optical signal transmission path between the second optical line terminal and the customer-premises equipment. Specifically, the first optical distribution network and the second optical distribution network each may be implemented as an intelligent ODN (iODN), an easy ODN, a smart ODN, or another type of ODN. This is not limited in this application.

Further, in an optional embodiment, the first optical distribution network may include at least one optical splitter, and an optical fiber between the first optical line terminal and the second optical line terminal. The second optical distribution network may also include at least one optical splitter, and an optical fiber between the second optical line terminal and the customer-premises equipment. The optical splitter herein is a passive device, and is used for downstream data distribution and upstream data aggregation. The optical splitter has one upstream optical interface and several downstream optical interfaces. Optical signals from the upstream optical interface are distributed to all of the downstream optical interfaces for transmission. Optical signals from the downstream optical interfaces are aggregated to the unique upstream optical interface for transmission.

It may be understood that the at least one optical splitter in the first optical distribution network may be configured to: perform multi-level splitting processing on an optical signal sent by the first optical line terminal, and then send a processed optical signal to the second optical line terminal, where a quantity of levels is related to a quantity of optical splitters. Similarly, the at least one optical splitter in the second optical distribution network may be configured to: perform multi-level splitting processing on an optical signal sent by the second optical line terminal, and then send a processed optical signal to the customer-premises equipment, where a quantity of levels is related to a quantity of optical splitters. It is clear that, with an optical splitter, only one optical fiber may be used to enable connection to an upper-layer device in an optical distribution network. Then, a plurality of optical fibers are used starting from the optical fiber, to connect to lower-layer devices. Such a point-to-multipoint transmission mode can reduce transmission medium overheads and networking costs.

In a specific embodiment, referring to FIG. 7, the first optical distribution network includes a first optical splitter, and the second optical distribution network includes a second optical splitter.

Figure 1:
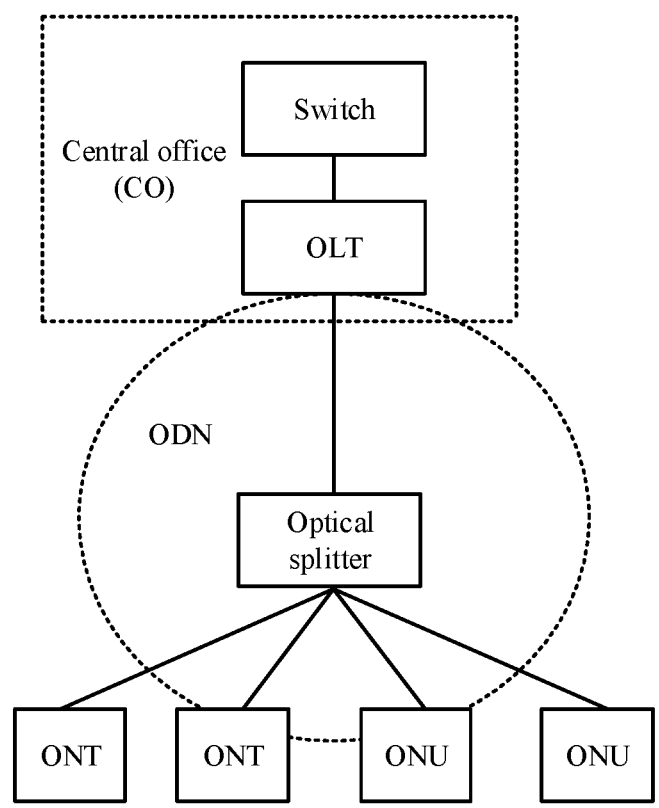
FIG. 1 is a structural diagram of a PON network in the prior art.

In the communications network shown in FIG. 6 or FIG. 7, the first optical line terminal may be connected to a plurality of second optical line terminals, and the second optical line terminal may be further connected to a plurality of customer-premises equipment. Compared with the communications network shown in FIG. 1, the communications network shown in FIG. 6 or FIG. 7 enables access of more customer-premises equipment. This expands a service scope.

Figure 8:
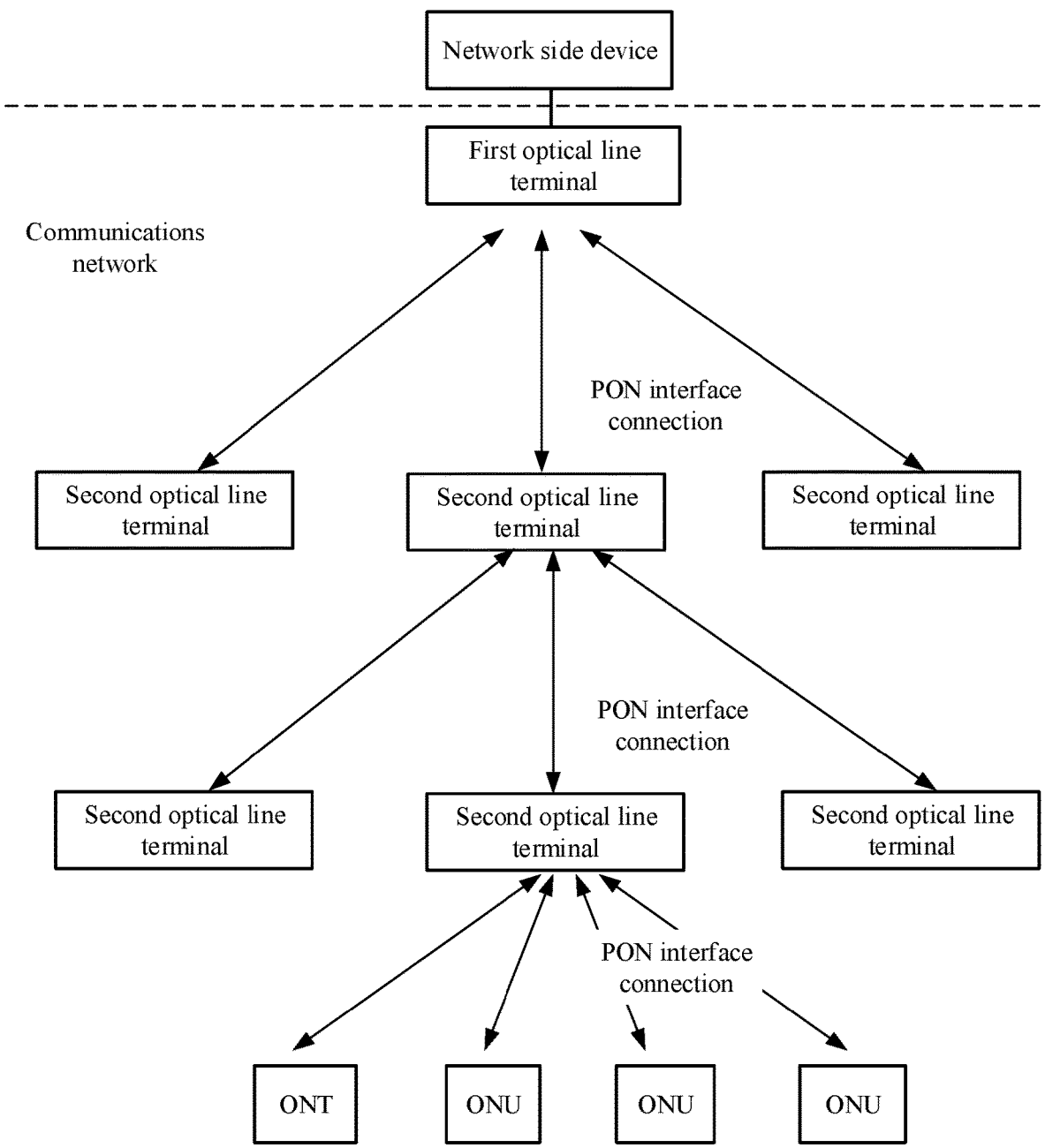
FIG. 8 is a schematic diagram of a structure of still another communications network according to this application.

Further, in the communications network shown in FIG. 6 or FIG. 7, a plurality of levels of second optical line terminals may be disposed. Referring to FIG. 8, the first optical line terminal is connected to a plurality of second optical line terminals, and the second optical line terminal may be further connected to another second optical line terminal, and is connected to the customer-premises equipment after a plurality of levels of connections. A communications network shown in FIG. 8 enables access of more customer-premises equipment. This expands a service scope.

2. Implementation of the Devices

Specifically, in this application, the first optical line terminal provides a PON interface used for communicating with a lower-layer device (namely, the second optical line terminal). The first optical line terminal may be a conventional optical line terminal (namely, a conventional OLT), or may be the optical line terminal shown in FIG. 3.

Specifically, the second optical line terminal provides not only a PON interface used for communicating with a lower-layer device (namely, the customer-premises equipment), but also a PON interface used for communicating with an upper-layer device (namely, the first optical line terminal). The first optical line terminal may be the optical line terminal 300 shown in FIG. 3.

Specifically, the customer-premises equipment is a device that sends Ethernet data to a user or receives Ethernet data sent by a user, and may provide various broadband services for the user, such as internet surfing, VoIP, HDTV, and video conference. In specific implementation, the customer-premises equipment may be a device such as an ONU or an ONT.

Specifically, the communications network shown in FIG. 6 is an optical access network, the optical access network is connected to a core network, and a network side device is a device that is in the core network and that is directly connected to the optical access network. In specific implementation, the network side device may be a switch, a router, or the like.

3. Deployment Locations of the Devices

Specifically, the network side device is an important device in an optical communications network, and is generally disposed in a central office. In an optional embodiment, as shown in FIG. 6, both the first optical line terminal and the network side device may be disposed in the central office. In an optional embodiment, the second optical line terminal may be disposed in a remote area relatively far away from the central office. Because the second optical line terminal is connected to lower-layer customer-premises equipment, the customer-premises equipment in this application may be deployed in a remote area such as a rural area relatively far away from a city, to enable access to a broadband service in the remote area.

In this application, optical splitters may be disposed based on an existing standard. This is not limited in this application. The following lists several possible cases of optical splitter deployment as examples, but is not intended to limit this application.

In an optional embodiment, the first optical line terminal and the second optical line terminal are connected through the first optical distribution network, and the first optical splitter is disposed in the first optical distribution network. In this case, a distance between the first optical splitter and the second optical line terminal is less than a distance between the first optical splitter and the first optical line terminal. In other words, the first optical splitter is disposed at a location closer to the second optical line terminal. The first optical splitter is connected to the first optical line terminal in the upstream through one optical fiber, and is connected to a plurality of second optical line terminals in the downstream through a plurality of optical fibers. Therefore, when the first optical splitter is disposed at the location closer to the second optical line terminal, lengths of the plurality of optical fibers can be shortened, and networking costs can be reduced.

Further, when a plurality of optical splitters are disposed in the first optical distribution network for multi-level splitting, the plurality of optical splitters may be disposed based on an actual situation and the existing standard. This is not limited in this application.

Similarly, in an optional embodiment, the second optical line terminal and the customer-premises equipment are connected through the second optical distribution network, and the second optical splitter is disposed in the second optical distribution network. In this case, a distance between the second optical splitter and the customer-premises equipment is less than a distance between the second optical splitter and the second optical line terminal. In other words, the second optical splitter is disposed at a location closer to the customer-premises equipment. The second optical splitter is connected to the second optical line terminal in the upstream through one optical fiber, and is connected to a plurality of customer-premises equipment in the downstream through a plurality of optical fibers. Therefore, when the second optical splitter is disposed at the location closer to the customer-premises equipment, lengths of the plurality of optical fibers can be shortened, and networking costs can be reduced.

Further, when a plurality of optical splitters are disposed in the second optical distribution network for multi-level splitting, the plurality of optical splitters may be disposed based on an actual situation and the existing standard. This is not limited in this application.

4. Data Transmission Process

In this application, the data transmission process includes a downstream transmission process and an upstream transmission process. In the downstream transmission process, a signal is sent from the network side device to the customer-premises equipment. In the upstream transmission process, a signal is sent from the customer-premises equipment to the network side device. Descriptions are separately provided below.

(1) Downstream Transmission Process

Figure 9:
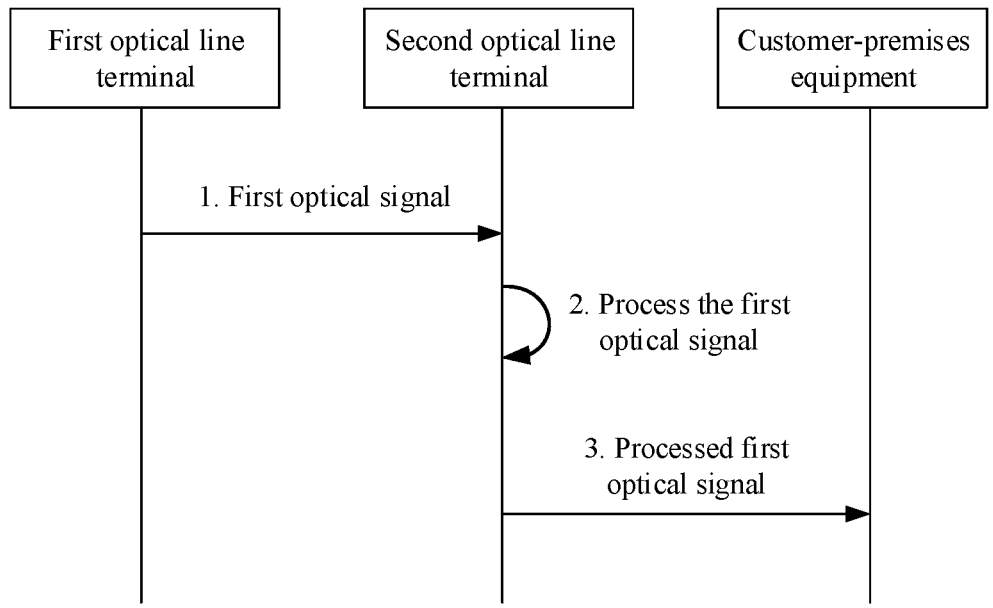
FIG. 9 is a schematic flowchart of data downstream transmission in a communications network according to this application.

Referring to FIG. 9, the downstream transmission process may include the following steps.

1. The first optical line terminal sends a first optical signal to at least one second optical line terminal.

In this application, the first optical signal may be obtained by converting an electrical signal received by the first optical line terminal. The electrical signal is sent by the network side device to the first optical line terminal through an Ethernet interface. Specifically, the first optical line terminal is connected to the network side device through the Ethernet interface. Generally, the network side device sends an electrical signal to the first optical line terminal. The first optical line terminal performs protocol conversion on the received electrical signal, and performs electrical-to-optical conversion on an electrical signal obtained after protocol conversion, to obtain the first optical signal. Then, the first optical line terminal sends, through a PON interface, the first optical signal to the at least one second optical line terminal connected to the first optical line terminal.

In an optional embodiment, the communications network further includes a first optical distribution network. The first optical signal sent by the first optical line terminal may be transmitted to the at least one second optical line terminal through the first optical distribution network.

Further, in an optional embodiment, the first optical distribution network includes a first optical splitter, and the first optical signal sent by the first optical line terminal may be transmitted to the at least one second optical line terminal through the first optical distribution network by using the first optical splitter.

2. The second optical line terminal processes the first optical signal.

Specifically, after receiving the first optical signal through a PON interface (for example, the first PON interface in FIG. 3) connected to an upper-layer device, the second optical line terminal performs protocol conversion processing on the first optical signal, so that a processed first optical signal is adapted to a PON interface connected to a lower-layer device.

Herein, for the protocol conversion processing operation performed on the first optical signal by the second optical line terminal, refer to a related description in FIG. 3, and details are not described herein.

3. The second optical line terminal sends the processed first optical signal to at least one customer-premises equipment.

In this application, the second optical line terminal sends the processed first optical signal to the at least one customer-premises equipment through the PON interface (for example, the second PON interface in FIG. 3) connected to the lower-layer device.

In an optional embodiment, the communications network further includes a second optical distribution network. The processed first optical signal sent by the second optical line terminal may be transmitted to the at least one customer-premises equipment through the second optical distribution network.

Further, in an optional embodiment, the second optical distribution network includes a second optical splitter, and the processed first optical signal sent by the second optical line terminal may be transmitted to the at least one customer-premises equipment through the second optical distribution network by using the second optical splitter.

It may be understood that in a data downstream transmission process, transmission is performed in a broadcast manner, and processed first optical signals received by all customer-premises equipment are the same. After receiving the first optical signal, the customer-premises equipment may receive, based on identification information carried in the first optical signal, data belonging to the customer-premises equipment; and may further perform optical-to-electrical conversion on the data, and then transmit, to a terminal device (such as a computer) directly used by a user, data obtained after optical-to-electrical conversion.

The data downstream transmission process is completed through the foregoing three steps. In the downstream transmission process, for functions of the devices, refer to detailed descriptions of the foregoing steps. Details are not described herein.

(2) Upstream Transmission Process

Figure 10:
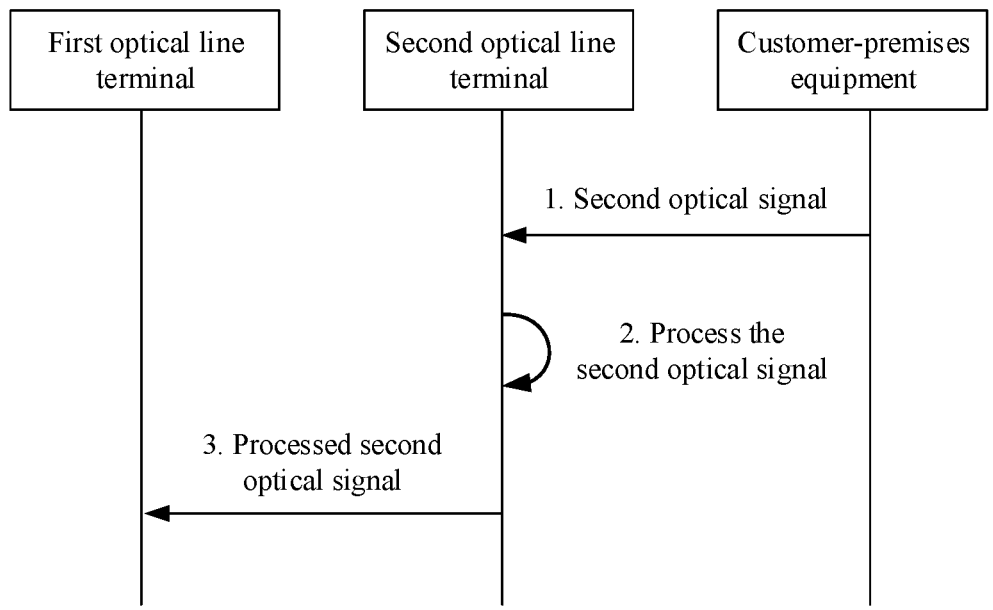
FIG. 10 is a schematic flowchart of data upstream transmission in a communications network according to this application.

Referring to FIG. 10, the upstream transmission process may include the following steps.

1. The customer-premises equipment sends a second optical signal to the second optical line terminal connected to the customer-premises equipment.

In this application, the second optical signal may be obtained by converting an electrical signal received by the customer-premises equipment. The electrical signal may be sent by a terminal device (such as a computer) directly used by a user to the customer-premises equipment through an Ethernet interface. Specifically, the customer-premises equipment is connected to the terminal device through the Ethernet interface. The terminal device sends an electrical signal to the customer-premises equipment when the terminal device needs to send data to a network side. The customer-premises equipment performs protocol conversion on the received electrical signal, and performs electrical-to-optical conversion on an electrical signal obtained after protocol conversion, to obtain the second optical signal. Then, the customer-premises equipment sends, through a PON interface, the second optical signal to the second optical line terminal connected to the customer-premises equipment.

In an optional embodiment, the communications network further includes a second optical distribution network. The second optical signal sent by the customer-premises equipment may be transmitted, through the second optical distribution network, to the second optical line terminal connected to the customer-premises equipment.

Further, in an optional embodiment, the second optical distribution network includes a second optical splitter, and the second optical signal sent by the customer-premises equipment may be transmitted, through the second optical distribution network by using the second optical splitter, to the second optical line terminal connected to the customer-premises equipment.

2. The second optical line terminal processes the second optical signal.

In this application, the second optical line terminal is connected to a plurality of customer-premises equipment, and the second optical line terminal may receive a plurality of second optical signals. The plurality of second optical signals received by the second optical line terminal may be different. Specifically, after receiving the second optical signal through a PON interface (for example, the second PON interface in FIG. 3) connected to a lower-layer device, the second optical line terminal performs protocol conversion processing on the second optical signal, so that a processed second optical signal is adapted to a PON interface connected to an upper-layer device.

Herein, for the protocol conversion processing operation performed on the second optical signal by the second optical line terminal, refer to a related description in FIG. 3, and details are not described herein.

3. The second optical line terminal sends the processed second optical signal to the first optical line terminal.

In this application, the second optical line terminal sends the processed second optical signal to the at least one customer-premises equipment through the PON interface (for example, the first PON interface in FIG. 3) connected to the upper-layer device.

In an optional embodiment, the communications network further includes a first optical distribution network. The processed second optical signal sent by the second optical line terminal may be transmitted to the first optical line terminal through the first optical distribution network.

Further, in an optional embodiment, the first optical distribution network includes a first optical splitter, and the processed second optical signal sent by the second optical line terminal may be transmitted to the first optical line terminal through the first optical distribution network by using the first optical splitter.

It may be understood that in the data upstream transmission process, transmission may be performed in a time division multiplexing (TDM) mode.

It may be understood that, after receiving the second optical signal, the first optical line terminal may further perform optical-to-electrical conversion on the second optical signal, and then transmit, to the network side device, an electrical signal obtained after optical-to-electrical conversion.

The data upstream transmission process is completed through the foregoing three steps. In the upstream transmission process, for functions of the devices, refer to detailed descriptions of the foregoing steps. Details are not described herein.

Figure 11:
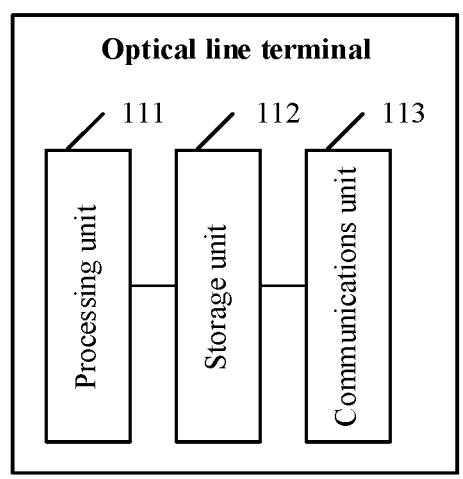
FIG. 11 is a functional block diagram of an optical line terminal according to this application.

The foregoing describes in detail the communications network in this application. FIG. 11 is a functional block diagram of an optical line terminal according to this application. As shown in FIG. 11, the optical line terminal may include a processing unit 111, a storage unit 112, and a communications unit 113. The communications unit 113 is configured with a first PON unit and a second PON unit.

During data downstream transmission, the communications unit 113 is configured to receive, through the first PON unit, a first optical signal sent by a first optical line terminal; the processing unit 111 is configured to process the first optical signal; and the communications unit 113 is further configured to send a processed first optical signal to customer-premises equipment through the second PON unit.

During data upstream transmission, the communications unit 113 is configured to receive, through the second PON unit, a second optical signal sent by the customer-premises equipment; the processing unit 111 is configured to process the second optical signal; and the communications unit 113 is further configured to send a processed second optical signal to the first optical line terminal through the first PON unit.

It may be understood that the optical line terminal shown in FIG. 11 may be implemented as the second optical line terminal in any one of FIG. 6 to FIG. 8. For functions of functional modules in the optical line terminal, refer to FIG. 6 to FIG. 8 and related descriptions. Details are not described herein.

In conclusion, the communications network in this application includes a first optical line terminal, a second optical line terminal, and customer-premises equipment. The second optical line terminal may be connected to a first optical line terminal at an upper layer through a PON interface, and may be further connected to customer-premises equipment at a lower layer through a PON interface. The communications network in this application enables a user in a remote area to access a broadband service. In addition, the PON interface features point-to-multipoint transmission, and therefore transmission media can be saved and networking costs can be reduced.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

What is claimed is:

1. A communications network, comprising a first optical line terminal, at least one second optical line terminal, and at least one customer-premises equipment;
the first optical line terminal comprises:
at least one processor; and
a memory coupled to the at least one processor and storing programming instructions for execution by the at least one processor, the programming instructions instruct the at least one processor to send, through a first passive optical network (PON) interface based on a first PON protocol, a first optical signal to the at least one second optical line terminal;
a second optical line terminal of the at least one second optical line terminal comprises:
at least one processor; and
a memory coupled to the at least one processor and storing programming instructions for execution by the at least one processor, the programming instructions instruct the at least one processor to:
denoise the first optical signal; and
send through a second PON interface based on a second PON protocol, the denoised first optical signal to the at least one customer-premises equipment during downstream data transmissions; and
process a second optical signal; and
send, through the first PON interface based on the first PON protocol, the processed second optical signal to the first optical line terminal during upstream data transmissions; and
each of the at least one customer-premises equipment comprises:
at least one processor; and
a memory coupled to the at least one processor and storing programming instructions for execution by the at least one processor, the programming instructions instruct the at least one processor to send, through the second PON interface based on the second PON protocol, the second optical signal to the second optical line terminal connected to the at least one customer-premises equipment.

2. The communications network according to claim 1, wherein the communications network further comprises a first optical distribution network and a second optical distribution network;
the first optical distribution network is configured to:
transmit, to each of the at least one second optical line terminal, the first optical signal sent by the first optical line terminal during downstream data transmission; and transmit, to the first optical line terminal, the processed second optical signal sent by the second optical line terminal during upstream data transmission; and
the second optical distribution network is configured to:
transmit, to each of the at least one customer-premises equipment, the denoised first optical signal sent by the second optical line terminal during data downstream data transmissions; and
transmit, to the second optical line terminal connected to the at least one customer-premises equipment, the second optical signal sent by the customer-premises equipment during upstream data transmissions.

3. The communications network according to claim 2, wherein the first optical distribution network comprises a first optical splitter, and the second optical distribution network comprises a second optical splitter; the transmit the first optical signal and the transmit the second optical signal are performed through the first optical splitter; and wherein the transmit the denoised first optical signal and the transmit the processed second optical signal are performed through the second optical splitter.

4. The communications network according to claim 3, wherein a distance between the first optical splitter and the second optical line terminal is less than a distance between the first optical splitter and the first optical line terminal.

5. The communications network according to claim 3, wherein a distance between the second optical splitter and the customer-premises equipment is less than a distance between the second optical splitter and the second optical line terminal.

6. The communications network according to claim 1, wherein each of the first PON protocol and the second PON protocol is one of a gigabit passive optical network (GPON), an Ethernet passive optical network (EPON), a 10G GPON, 10G EPON, or a time wavelength division multiplexing (TWDM) PON protocol.

7. The communications network according to claim 1, wherein the customer-premises equipment is one of an optical network unit (ONU) or an optical network terminal (ONT).

8. An optical line terminal, comprising at least one processor, a communications apparatus configured with a first passive optical network (PON) interface and a second PON interface, and a non-transitory computer-readable storage medium coupled with the at least one processor and the communications apparatus; the non-transitory computer-readable storage medium stores programming instructions for execution by the at least one processor, the programming instructions instruct the at least one processor to:
denoise a first optical signal; and
process a second optical signal; and
cause the communications apparatus to:
receive, through the first PON interface, a first optical signal based on a first PON protocol; and
send the denoised first optical signal based on a second PON protocol to customer-premises equipment through the second PON interface during downstream data transmissions; and
receive, through the second PON interface, the second optical signal based on the second PON protocol sent by the customer-premises equipment; and
send the processed second optical signal based on the first PON protocol through the first PON interface during upstream data transmissions.

9. The optical line terminal according to claim 8, wherein the optical line terminal further comprises an optical module, a first PON media access control (MAC) chip, and a second PON MAC chip, wherein the first PON MAC chip adopts a protocol corresponding to the first PON interface, and the second PON MAC chip adopts a protocol corresponding to the second PON interface;

denoise the first optical signal comprises:

instructing the optical module to convert the first optical signal into a first electrical signal, instructing the first PON MAC chip to perform protocol deframing on the first electrical signal, instructing the second PON MAC chip to perform protocol framing on a first electrical signal obtained after the protocol deframing, and instructing the optical module to perform electrical-to-optical conversion on a first electrical signal obtained after the protocol framing; and process the second optical signal comprises:

instructing the optical module to convert the second optical signal into a second electrical signal, instructing the second PON MAC chip to perform protocol deframing on the second electrical signal, instructing the first PON MAC chip to perform protocol framing on a second electrical signal obtained after the protocol deframing, and instructing the optical module to perform electrical-to-optical conversion on a second electrical signal obtained after the protocol framing.

10. The optical line terminal according to claim 8, the programming instructions instruct the at least one processor to:

parse, based on the first PON protocol, the first optical signal and encapsulate a parsed first optical signal based on the second PON protocol during downstream data transmissions; and parse, based on the second PON protocol, the second optical signal and encapsulate a parsed second optical signal based on the first PON protocol during upstream data transmissions.

11. The optical line terminal according to claim 8, wherein each of the first PON protocol and the second PON protocol is one of a gigabit passive optical network (GPON), an Ethernet passive optical network (EPON), a 10G GPON, 10G EPON, or a time wavelength division multiplexing (TWDM) PON protocol.

12. A method for processing optical signals in an optical line terminal, comprising:

during data downstream transmission, receiving, through a first passive optical network (PON) interface, a first optical signal in a first PON protocol; denoising the first optical signal; and sending, through a second PON interface, a processed first optical signal in a second PON protocol to customer-premises equipment; and during data upstream transmission, receiving, through the second PON interface, a second optical signal in the second PON protocol from the customer-premises equipment; processing the second optical signal; and sending, through the first PON interface, a processed second optical signal in the first PON protocol.

13. The method according to claim 12, wherein denoising the first optical signal comprises:

converting the first optical signal into a first electrical signal;

performing protocol deframing on the first electrical signal;

performing protocol framing on a first electrical signal obtained after protocol deframing; and performing electrical-to-optical conversion on a first electrical signal obtained after protocol framing, to obtain a processed first optical signal; and wherein processing the second optical signal comprises:

converting the second optical signal into a second electrical signal;

performing protocol deframing on the second electrical signal;

performing protocol framing on a second electrical signal obtained after protocol deframing; and performing electrical-to-optical conversion on a second electrical signal obtained after protocol framing, to obtain a processed second optical signal.

14. The method according to claim 12, wherein denoising the first optical signal comprises:

parsing, by using the first PON protocol, the first optical signal, and encapsulating a parsed first optical signal by using the second PON protocol; and wherein processing the second optical signal comprises:

parsing, by using the second PON protocol, the second optical signal, and encapsulating a parsed second optical signal by using the first PON protocol.

15. The method according to claim 12, wherein a mode of sending a processed second optical signal during the data upstream transmission is a time division multiplexing (TDM) mode.

16. The method according to claim 12, wherein each of the first PON protocol and the second PON protocol is one of a gigabit passive optical network (GPON), an Ethernet passive optical network (EPON), a 10G GPON, 10G EPON, or a time wavelength division multiplexing (TWDM) PON protocol.

17. The method according to claim 12, wherein the customer-premises equipment is one of an optical network unit (ONU) or an optical network terminal (ONT).

\* \* \* \* \*